Dec. 26, 1961  G. C. FUHRMAN  3,014,391
SPINDLE
Filed July 31, 1958  2 Sheets-Sheet 1
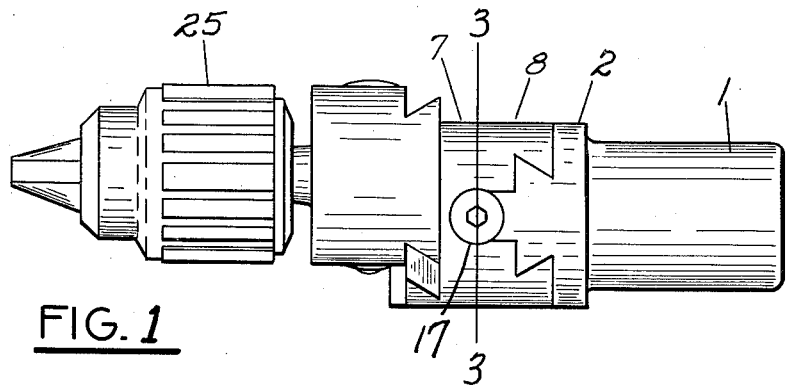
FIG. 1
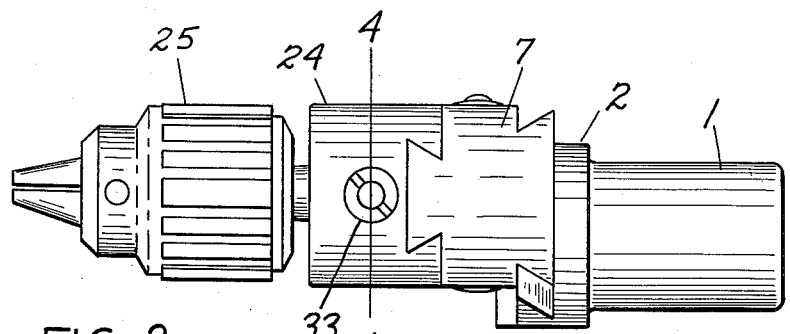
FIG. 2
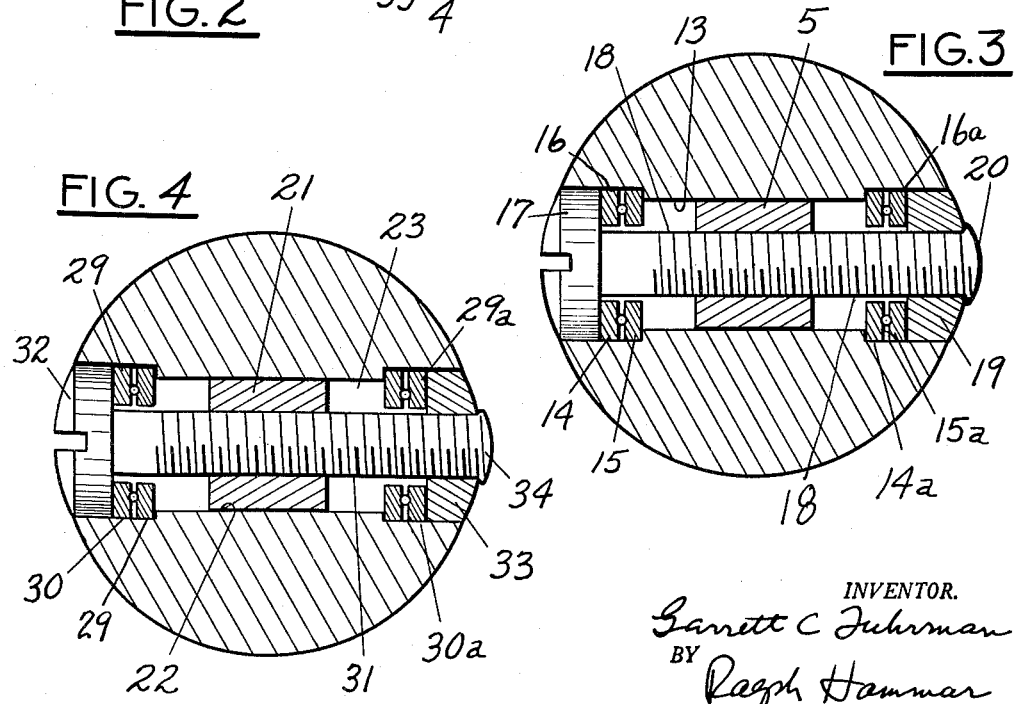
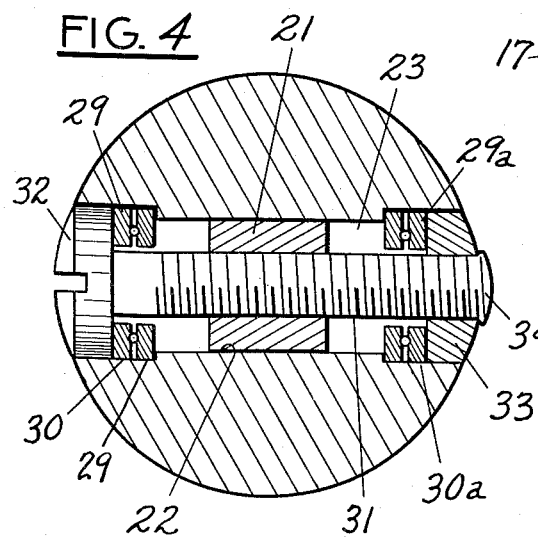
INVENTOR.
Garrett C. Fuhrman
BY Ralph Hammar
Attorney Dec. 26, 1961   G. C. FUHRMAN   3,014,391
SPINDLE
Filed July 31, 1958   2 Sheets-Sheet 2
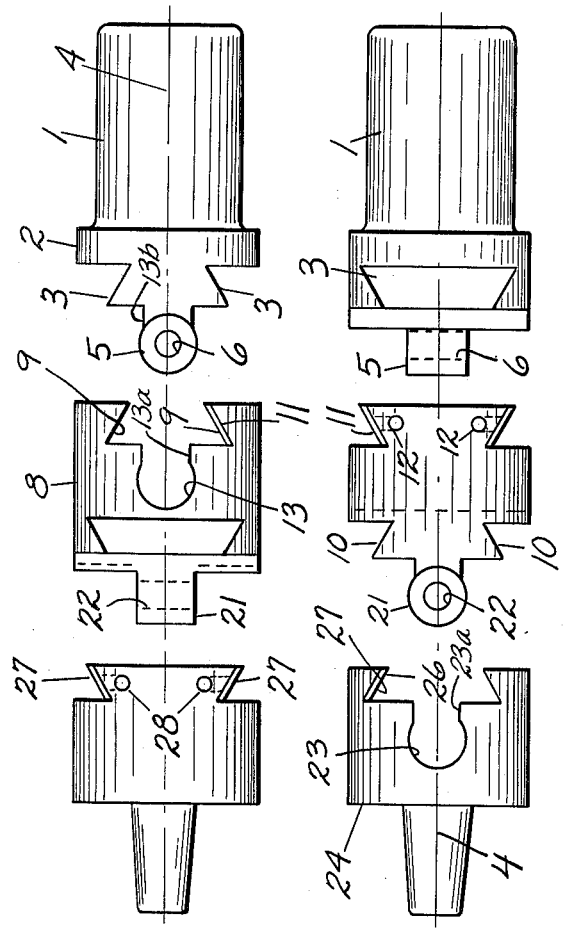
FIG.5   FIG.6
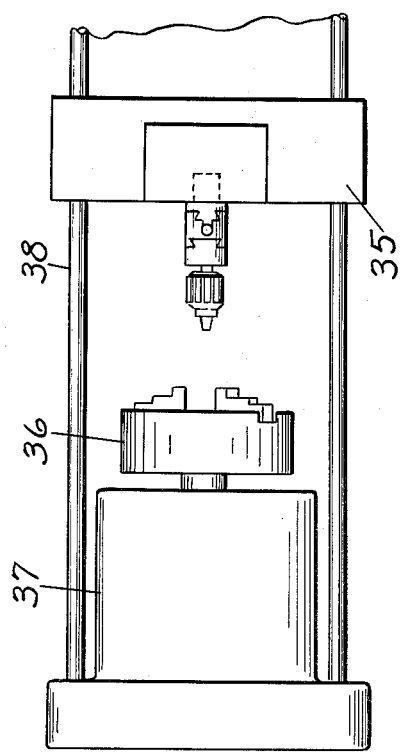
FIG.7
INVENTOR.
Garrett C. Fuhrman
BY
Ralph Hammer
Attorney
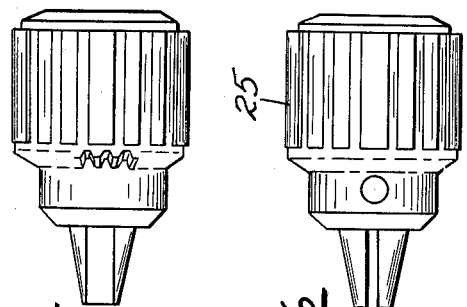

United States Patent Office 3,014,391
Patented Dec. 26, 1961

3,014,391
SPINDLE
Garrett C. Fuhrman, P.O. Box 795, Erie, Pa.
Filed July 31, 1958, Ser. No. 752,276
1 Claim. (Cl. 82—31)

In lathes, the tail stock spindles tend to become out of line as the bearing surfaces wear or as the spindles are subjected to bending stress. The restoration of alignment is possible but is a major job. In the case of a lathe where the bed is worn, unless the bed is scraped true, the realignment will be effective for only one position of the tail stock with misalignment remaining for all other positions.

This invention is a tail stock spindle for a lathe which permits quick correction of any misalignment. The spindle has adjustments in two directions at right angles to each other and to the longitudinal axis of the spindle. In turret lathes, one end of the spindle might fit in the turret while the other end of the spindle might carry a center drill or a reamer or other tool.

In the drawings, FIG. 1 is a side elevation of a spindle with provisions for correcting spindle misalignment; FIG. 2 is a top plan view; FIG. 3 is a section on line 3—3 of FIG. 1; FIG. 4 is a section on line 4—4 of FIG. 2; FIG. 5 is an exploded view of the parts in the position of FIG. 1; FIG. 6 is an exploded view of the parts in the position shown in FIG. 2; and FIG. 7 is a diagrammatic top view showing how the adapter might be applied to the tail stock of a lathe.

The spindle illustrated which is designed for installation in lathes has a cylindrical shank 1 which may, for example, be fixed in the tail stock or turret of a lathe. The shape of the shank 1 is not critical. Other shapes may be used. At the outer end of the shank 1 is a cylindrical section or head 2 in which is machined a dovetail 3 having sides parallel to each other and equally spaced on opposite sides of the longitudinal axis 4 of the shank 1. The outer end of the shank 1 terminates in a tang 5 projecting beyond the dovetail 3 having a threaded opening 6 parallel to the dovetail and centered on and perpendicular to the axis 4. The tang 5 includes a neck 136 having flat parallel sides and a spherical head. The parts so far described are intended to be solidly mounted in the tail stock or turret of a lathe and are not intended to move relative to the tail stock or turret after mounting.

The intermediate part 7 of the spindle has a cylindrical body 8 with dovetail grooves 9 at one end and a dovetail 10 at the opposite end. The dovetail grooves 9 are equally spaced on opposite sides of the axis 4 and are parallel to and mate with the dovetail 3. In order that there may be a tight fit between the dovetail 3 and grooves 9, one side of one of the dovetail grooves 9 is provided with a plate 11 which may be tightened by means of set screws 12. This takes up all of the clearance between the dovetail 3 and grooves 9 but permits the intermediate part 7 to slide along the dovetail 3. Between the dovetail grooves 9 the intermediate part 7 has a bore 13 and a slot 13a connecting the bore and grooves. The bore 13 and slot 13a are open at one end to permit insertion of the tang structure 5 which is slidably received in the bore and slot. The axis of the bore 13 is parallel to the dovetail 3 and grooves 9 and concentric with the threaded opening 6 in the tang 5. At the outer ends of the bore 13 are enlargements 14, 14a (FIG. 3) in which are fixed the raceways 15, 15a of ball thrust bearings. The other raceways 16, 16a of the ball thrust bearings bear respectively against the head 17 of an adjusting screw 18 and a nut 19 threaded on the other end of the screw. The screw 18 is screwed into the tang 5 so that as the screw is turned, the intermediate part of the adapter is caused to slide radially to the axis of the spindle. This positively positions the intermediate member of the adapter. After the nut 19 has been tightened to take up the back lash, the outer end of the screw is peened over as indicated at 20 to prevent loosening of the nut.

The other end of the intermediate member has an integral tang 21 with a radial threaded opening 22 therein extending in a direction at right angles to the dovetail grooves 9 or parallel to the dovetail 10. The purpose of the tang 21 is to permit radial adjustment relative to the intermediate member in a direction at right angles to that provided by the dovetail 3 and grooves 9. The tang is slidably received in a bore 23 and slot 23a in a tool holder part 24 which is shown as carrying a chuck 25 but which obviously might carry any other form of tool or tool holder. On opposite sides of the longitudinal axis 4 of the spindle the tool holder part 24 has dovetail grooves 26 slidable on the dovetail 10 in the intermediate part of the spindle. In order to take up any clearance, one side of the dovetail grooves 26 may be provided with a plate 27 which is tightened by means of set screws 28. At opposite ends of the bore 23 are enlargements 29, 29a (FIG. 4) receiving ball thrust bearings 30, 30a. An adjusting screw 31 having a head 32 at one end and a nut 33 at the other end is screwed into the threaded opening 22 in tang 21. As the adjusting screw 31 is turned, the tool holder part 24 is caused to move relative to the intermediate part in a direction at right angles to the movement caused by the adjusting screw 18. This positively locates the tool holder part 24 with reference to the intermediate part of the adapter. After tightening the nut 33, the outer end of the adjusting screw 31 is peened over as indicated at 34 to prevent loosening of the nut.

By use of the adjusting screws 18 and 31, it is possible to bring any tail stock or turret spindle into perfect alignment as diagrammatically illustrated in FIG. 7 where the spindle is shown fixed to the tail stock 35 of a lathe. The work is held in a chuck 36 in the head stock 37 and the tail stock must be repeatedly slid back and forth along ways 38 during the operation of the lathe. Even though the lathe were in perfect alignment when made, as it is used wear causes misalignment. In lathes misalignment caused by wear of the ways 38 is common and is difficult to correct without a major rebuilding operation. However, with the spindle disclosed, perfect correction can be made for misalignment caused by wear in the ways 38. No matter how the shank 1 is oriented when it is fixed in the tail stock 35, the two direction radial adjustment provided by the screws 18 and 31 permits the axis of the tool holder 25 to be quickly and accurately brought into coincidence with the axis of the chuck 36 in the head stock. This adjustment for misalignment can be made with the tail stock 35 in its working position so that the effects of non-uniform wear in the ways are completely compensated.

What is claimed as new is:

In a lathe having a head stock with a rotatable chuck and a tail stock slidable along ways axially toward and away from the chuck, a tail stock spindle having two end sections and an intermediate section, one end section having a shank remote from the intermediate section and immovably fixed on the tail stock, the other end section having a tool holder remote from the intermediate section, said intermediate section having on one end a radially extending dovetail with a tang projecting axially away from the dovetail and having a threaded opening parallel to the dovetail, said intermediate section having on the other end a radial dovetail groove and a radial bore at the bottom of and parallel to the dovetail groove with said dovetail groove and bore being open at one end and at right angles to said dovetail and the opening in said tang, one end section having adjacent the intermediate section a radially extending dovetail slidably received in the dovetail groove in said intermediate section and further having a tang projecting axially away from the dovetail and slidably received in the bore in said intermediate section and having a threaded opening parallel to the dovetail, the other end section having adjacent the intermediate section a radial dovetail groove and a radial bore at the bottom and parallel to the dovetail groove with said dovetail groove and bore being open at one end and slidably receiving the dovetail and tang on said intermediate section, a screw journaled in said intermediate section by thrust bearings on opposite sides of the tang of said one end section and extending through said bore of the intermediate section and threaded in the tang of said one end section received in said bore for positioning the intermediate section along said dovetail on the end section received in the dovetail groove in said intermediate section to shift the axis of the intermediate section radially with respect to the axis of the spindle, another screw journaled in said other end section by thrust bearings on opposite sides of the tang of said intermediate section and threaded in the tang of said intermediate section received in the bore of said other end section for positioning said other end section along the dovetail of the intermediate section and at right angles to the motion caused by said first screw, said screws being adapted to bring the axis of the tool holder into coincidence with the axis of the chuck.

References Cited in the file of this patent

UNITED STATES PATENTS

| | | |
|---|---|---|
| 892,894 | Roman | July 7, 1908 |
| 1,241,177 | Watts | Sept. 25, 1917 |
| 2,251,413 | Munkebo | Aug. 5, 1941 |
| 2,305,737 | Richards | Dec. 22, 1942 |
| 2,507,155 | Gruen et al. | May 9, 1950 |
| 2,598,477 | Wilberschied | May 27, 1952 |
| 2,833,544 | Blades | May 6, 1958 |